(12) United States Patent
Whipple

(10) Patent No.: US 6,301,830 B1
(45) Date of Patent: Oct. 16, 2001

(54) GUY LINE SYSTEM

(76) Inventor: Gaylord C. Whipple, 12012 Skyline Dr., Santa Ana, CA (US) 92705

( * ) Notice: Subject to any disclaimer, the term of this patent is extended or adjusted under 35 U.S.C. 154(b) by 0 days.

(21) Appl. No.: 09/440,960

(22) Filed: Nov. 16, 1999

Related U.S. Application Data

(63) Continuation-in-part of application No. 09/133,474, filed on Aug. 13, 1998, now abandoned, which is a continuation-in-part of application No. 29/085,646, filed on Mar. 27, 1998, now abandoned, which is a continuation-in-part of application No. 29/076,526, filed on Sep. 12, 1997, now abandoned.

(51) Int. Cl.[7] .................................................... A01G 17/14
(52) U.S. Cl. ................................................. 47/43; 52/148
(58) Field of Search ...................... 47/42–44, 24, 47/46, 47, 58; 52/163, 148, 147, 146, 166, 162; 135/120.2, 120.4; 248/499, 508, 509

(56) References Cited

U.S. PATENT DOCUMENTS

| | | | |
|---|---|---|---|
| 936,824 | * 10/1909 | Simpson et al. | 52/163 |
| 2,229,935 | * 1/1941 | Powers | 24/131 R |
| 2,712,864 | * 7/1955 | Clevett | 52/163 |
| 3,040,477 | * 6/1962 | June | 47/43 |
| 3,143,122 | * 8/1964 | Goodrich | 135/87 |
| 3,680,274 | * 8/1972 | Delke | 52/157 |
| 3,888,057 | * 6/1975 | Zubke | 52/163 |
| 4,319,428 | * 3/1982 | Fox | 47/42 |
| 4,649,666 | * 3/1987 | Ness et al. | 47/43 |
| 4,870,781 | * 10/1989 | Jones | 47/43 |
| 5,867,936 | * 2/1999 | Napolitano | 47/43 |

* cited by examiner

Primary Examiner—Charles T. Jordan
Assistant Examiner—Son T. Nguyen
(74) Attorney, Agent, or Firm—Harold L. Jackson

(57) ABSTRACT

A tree guy line system including a plurality of guy lines with each line having a first and second end and a limited extension spring assembly disposed between the ends to allow a limited extension of the lines to absorb large forces due to wind gusts, etc. A plurality of anchors are adapted to be inserted into the ground at spaced locations around the tree with the second end of each line being secured to a respective anchor. A line adjacent the first end thereof forming a collar for placement around the trunk or limb of a tree where the line extends from both ends of the collar. A tension bar has a line engaging end slidably mounted on the line below the collar and another end of the tension bar secured to the first end of the line so that the line engaging end can be moved along the line to remove slack and place the line in tension.

5 Claims, 4 Drawing Sheets

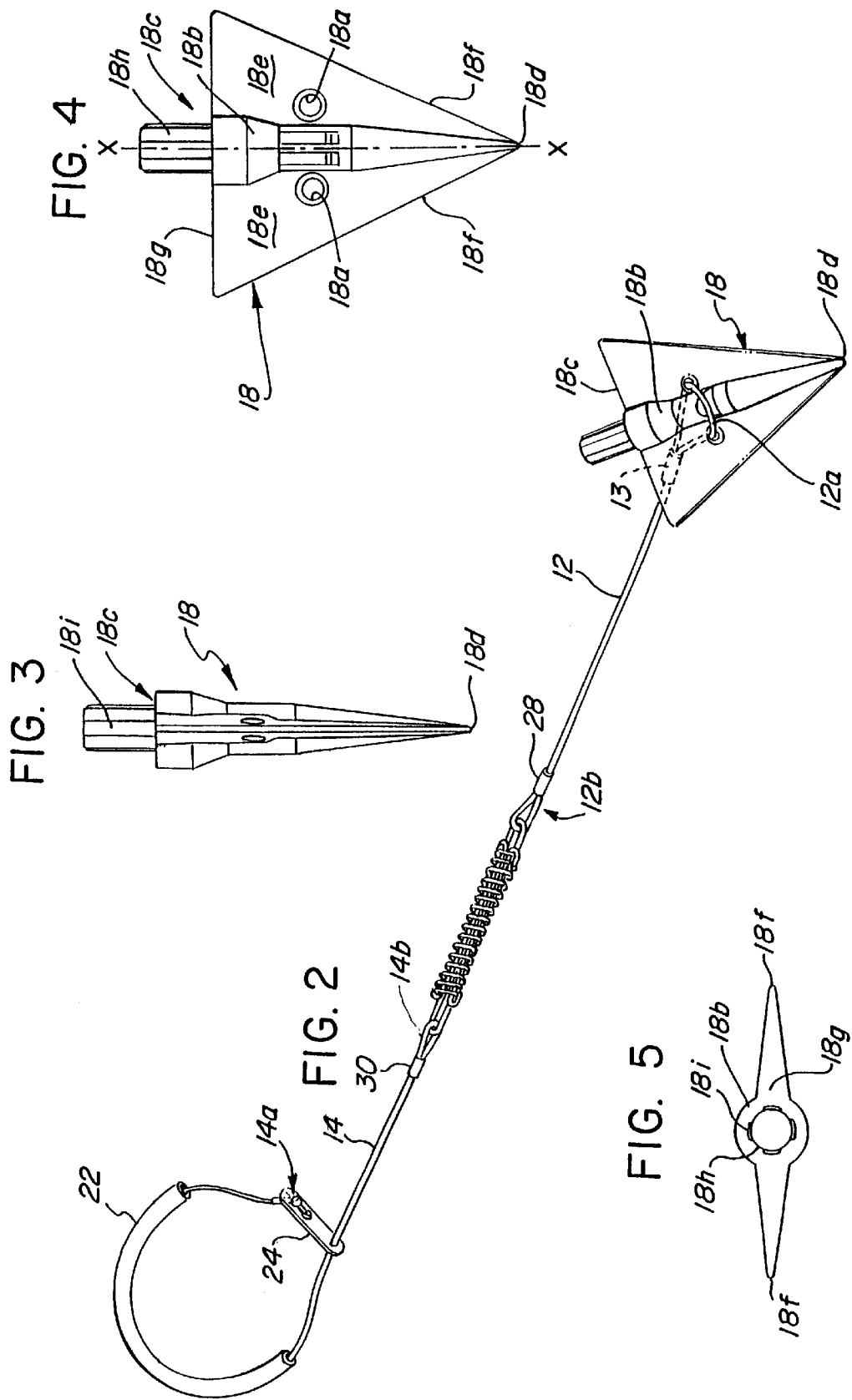

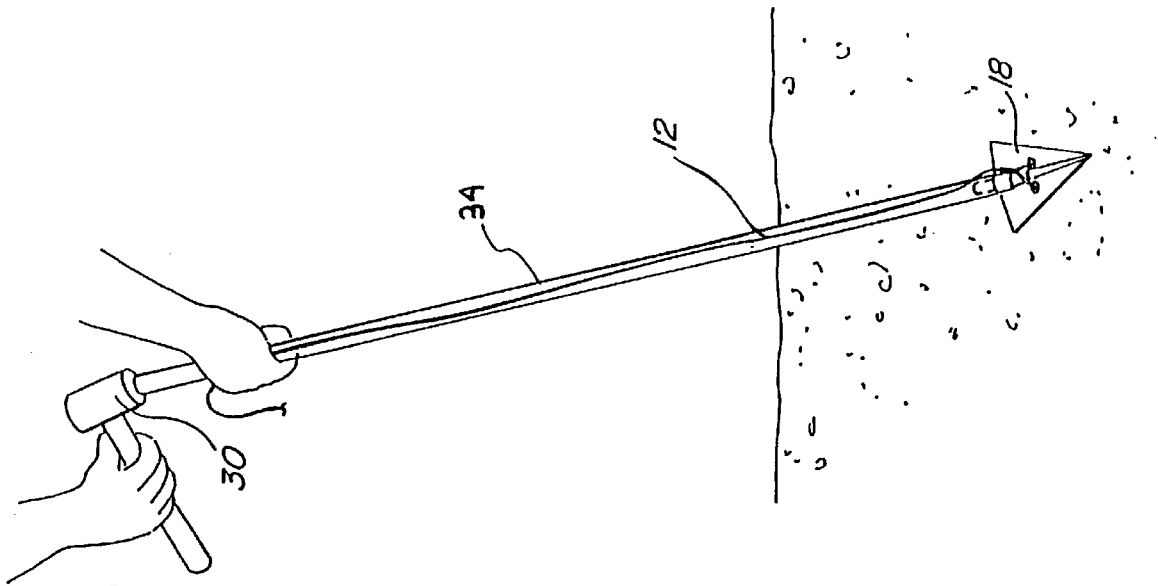
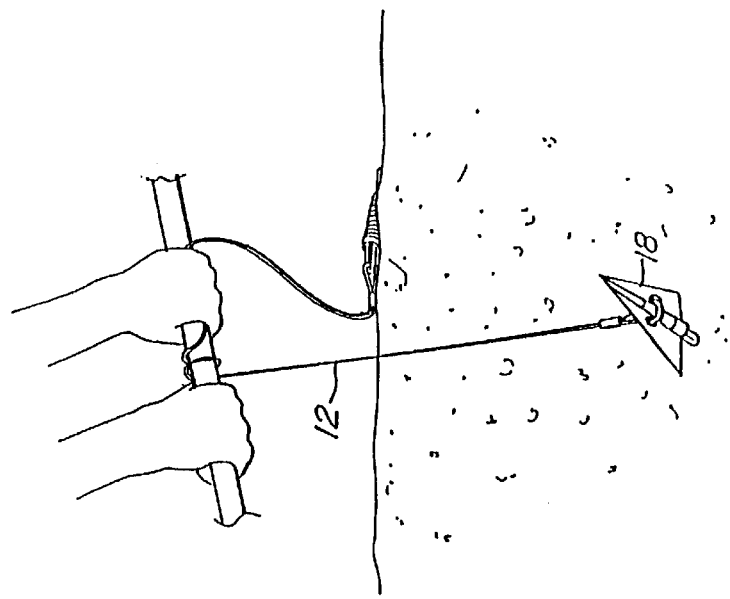

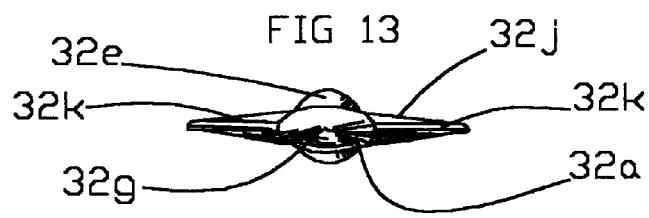
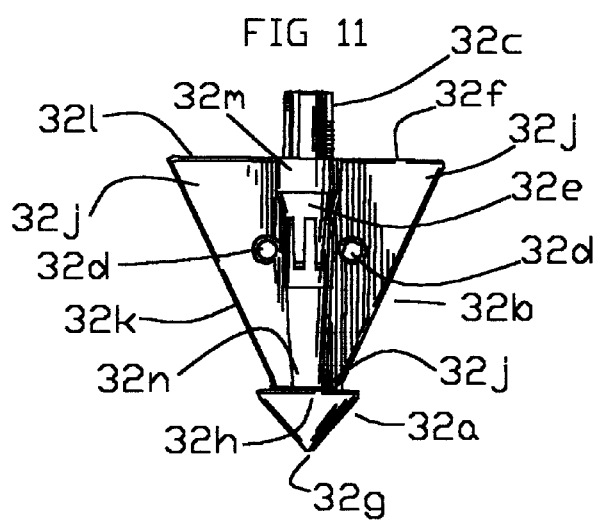
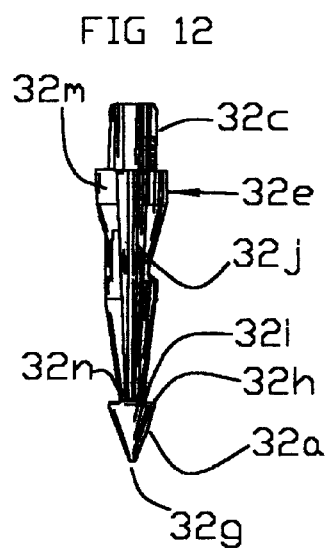
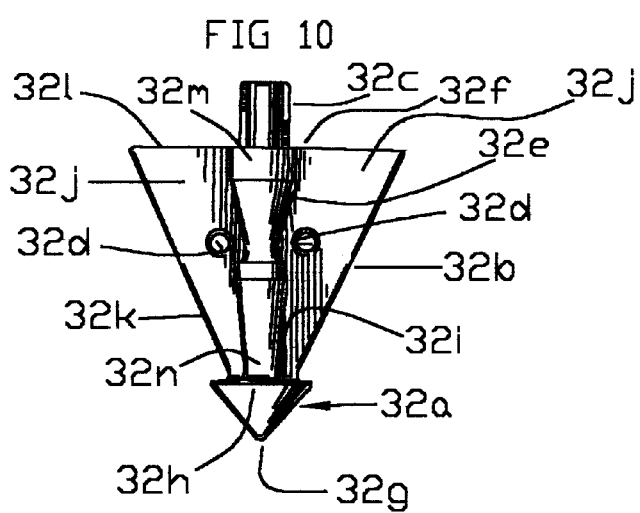

GUY LINE SYSTEM

RELATED APPLICATIONS

This application is a continuation-in-part of application Ser. No. 09/133,474, filed Aug. 13, 1998, now abandoned, which in turn is a continuation-in-part of design patent application Ser. No. 29/085,646, filed Mar. 27, 1998, now abandoned, which in turn is a continuation-in-part of design patent application Ser. No. 29/076,526, filed Sept. 12, 1997, now abandoned.

FIELD OF THE INVENTION

The present invention relates to guy line systems for supporting newly planted trees as well as other objects and more particularly to guy line systems which will accommodate external forces applied to a tree due, for example, to winds.

DESCRIPTION OF THE PRIOR ART

It is common practice to support newly planted trees to control their direction of growth and prevent them from falling or being knocked down by external forces resulting from wind, etc. The most common practice is to set a vertically oriented support post next to the tree and tie the tree to the post by means of a wire inserted through a collar of rubber tubing, such as a garden hose. This type of system, while simple and generally inexpensive, may (and often does) adversely affect the growth of the tree unless the tree is periodically retied and the post removed after the tree has achieved sufficient growth to remain stable independently of the support post. One disadvantage of this conventional system is that it is unyielding and may result in the supported tree breaking above the supporting tie line under extreme wind conditions.

U.S. Pat. No. 4,222,198 ("'198 patent") discloses a tree support system for alleviating this problem. According to the '198 patent, two compression springs are disposed in the collar with one end of each spring abutting a spool like stop retained in the ends of the collars.

Two wires which pass through passageways in the stops are secured to separate washers which abut the opposite ends of the springs. The two wires are looped around a vertically oriented post and twisted together. While the springs and tie lines of the '198 patent provide a yielding support for the tree, both this system and the more conventional system suffer from shortcomings.

As an example, the support provided to the tree is limited to a force with which the single post can withstand before losing its footing in the ground.

Another use of springs as applied to a tree stabilizing system is identified in U.S. Pat. No. 5,867,936 ("'936 patent"). In the '936 patent a tubular rubber synthetic polymer forms a collar and supports the rod ends of a compression spring assembly. The same material is also used as a tether. The tether houses the opposing spring ends of four compression spring assemblies. Two of the ends connect to the collar and the other two connect to rods that are tied to the stakes.

This system is complicated and could inevitably be self defeating. The numerous uses of compression spring assemblies allows for a degree of yielding that could fail to support the tree adequately in windy conditions or tend to oscillate the tree to an unacceptable degree as winds rise and subside. Furthermore, this system requires two stakes for each resilient tree guy assembly. This requires more effort, is more time consuming, and more difficult to obtain the correct tension in the tether.

Another, although less used system, employs several stakes or posts which are set into the ground at spaced points around the tree with wires or ropes tied between the stakes and the tree. While this guy line type of system is capable of resisting appreciably more external force than a single post, it is time consuming to adjust the length of the separate lines during installation so that when the tree is in its desired position, little, if any, slack remains in the tie lines. This would be a particular problem for the '198 system where two lines extend from the post to the tree with the ends of the lines being twisted together after being looped around the supporting post. Turnbuckles, which are frequently used to adjust the length of tie lines, would be an improvement over simply twisting a pair of wires together or one wire back on itself. However, the use of turnbuckles is also time consuming and they have a tendency to corrode and freeze-up.

Another yieldable tree support system utilizing coiled extension springs connected between the supporting posts and the tree is disclosed in U.S. Pat. No. 4,649,666 ("'666 patent"). This type of system suffers not only from the length of the line adjustment problem, but may provide little protection for the tree once the elastic limit of the springs is exceeded by a strong wind gust and the like. The use of extension springs like that shown in the '66 patent has been used with stakes embedded entirely in the ground with the same shortcomings.

Others have used ground anchors to tie down articles such as the one identified in U.S. Pat. No. 2,712,864 ("'864 patent"). The '863 patent is not directed to use for securing trees and does not anticipate such application. The anchor is of a triangular shape that has a body, holes for receiving the guy line and a reduced extension end for receiving a device to drive the anchor in the ground.

The '864 patent anchor has drawbacks. This anchor has a large body area in relation to the sides which could result in more difficulty in driving the anchor into the ground and less resistance for holding the tree in place when the anchor is turned. Furthermore, the body does not accommodate the guy line with any indentation. This could allow the guy line to slip from the anchor as the anchor is driven into the ground and possibly resulting in a less secure arrangement. Finally, the shape of the edges does not taper from the body to the ends. This creates a less secure edge than one that does taper.

Still others have use a tension bar to tighten a line as in U.S. Pat. No. 278,097 ("'097 patent"). The '097 patent does not identify an application for a tree support system. The tension bar is composed of not only two holes but at least four alternating notches in the side edges.

This arrangement has a number of drawbacks. First, since neither end of the line is secured at the tension bar, the bar can potentially slide along the line if given enough force. Secondly, the bar is cumbersome and complicated. The line must be weaved through the bar. This is time consuming and not given to easily changing the tension in the line at a later time. Finally, the numerous notches in the bar could undermine the structural integrity of the bar where large forces are used. Such a condition could exist in gusty wind areas.

Another tension bar arrangement is identified in U.S. Pat. No. 2,229,935 ("'935 patent"). This bar overcomes one of the short comings of the '097 patent by securing one end of the line to the bar. However, as in the '097 patent, the use of a notch creates problems. In particular, the use of the bar is complicate by a need to bend the bar to enclose the line into the notch. Furthermore, should the line slip form the notch the bar could become dislodged allowing for the line to slip.

There is a need for a tree guy line system which overcomes the above problems.

SUMMARY OF THE INVENTION

A tree guy line system, in accordance with the present invention, employs a plurality of guy lines, made, for example, of wire rope. Each guy line includes a first and a second end with a limited expansion spring disposed between the ends thereof to allow a limited increase in the distance between the ends of the guy line in response to tensile force applied to the line. A plurality of anchors are adapted to be inserted into the ground at spaced locations around the tree with the second end of each line secured to a respective anchor. A flexible collar, to act as a protective buffer between the guy line and the tree bark, is preferably positioned over each guy line adjacent the first end for extension around the trunk or a limb of a tree to be supported. A tension bar has a line engaging end slidably mounted on the line adjacent the first end thereof below the collar and another end secured to the first end of the line. The line engaging end of the tension bar is arranged to slide along the line towards the second end thereof to remove slack and place the line in tension and to grasp the line when placed at a predetermined angle to the line to maintain the tension in the line.

The features of the present invention may be best understood by reference to the following description taken in conjunction with the accompanying drawings in which like components are given the same reference numeral in the several figures.

BRIEF DESCRIPTION OF THE DRAWINGS

FIG. 2 is a perspective view of one of the anchors and tree line assemblies of FIG. 1;

FIG. 3 is a vertical elevational view of the anchor;

FIG. 4 is a vertical plane view of the anchor showing the side opposite to that shown in FIG. 2;

FIG. 5 is a top plan view of the anchor;

FIG. 8 is a side view of the anchor being driven into the ground;

FIG. 9 is a side view of the anchor being rotated in the ground by applying force on the guy line;

FIGS. 10 and 11 are planar views of an alternate embodiment of the anchor, for use in the present invention, as viewed from the top and bottom;

FIG. 12 is a side elevation view of the anchor of FIGS. 10 and 11, and;

FIG. 13 is a bottom plan view of the anchor of FIGS. 10 and 11.

DESCRIPTION OF THE PREFERRED EMBODIMENT

Figure 1:
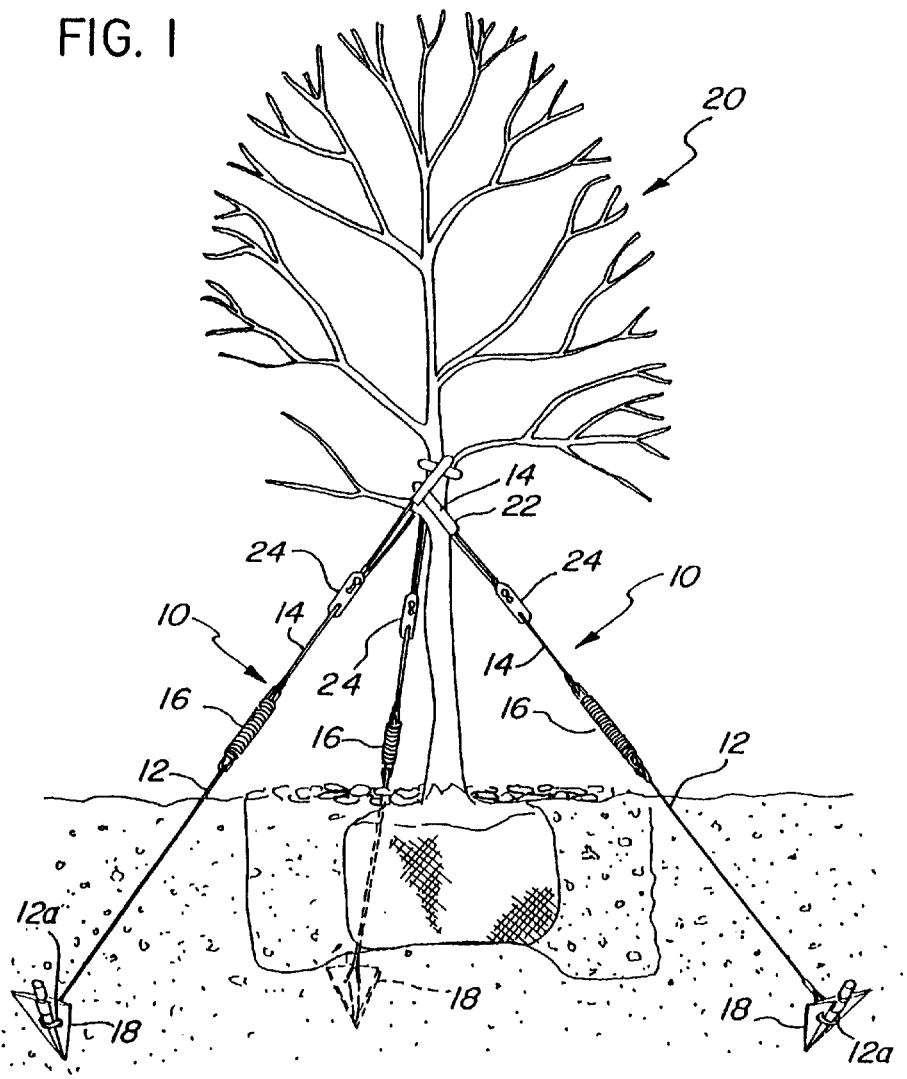
FIG. 1 is an exemplary elevational view illustrating a preferred manner of use of the invention wherein three arrow type anchors are embedded in the ground and spaced about equally around the circumference of a tree to be stabilized or supported with shock absorbing guy lines secured between the anchors and the tree and tension bars for removing slack from the lines.

Referring now to the figures, a guy line system, in accordance with the present invention, includes a plurality of guy lines 10 formed in two separate sections, i.e., lower section 12 and an upper section 14, with a limited extension spring assembly 16 connected between the two sections. One end 12a of each lower guy line section, after extending through a pair of openings 18a in an anchor 18, is clamped to the line exiting the openings via a crimping sleeve 13, as will be explained in more detail. The anchors are adapted to be embedded in the ground at spaced locations, say at 120° intervals, around the tree 20 to be stabilized or supported, as is illustrated in FIG. 1.

Figure 7:
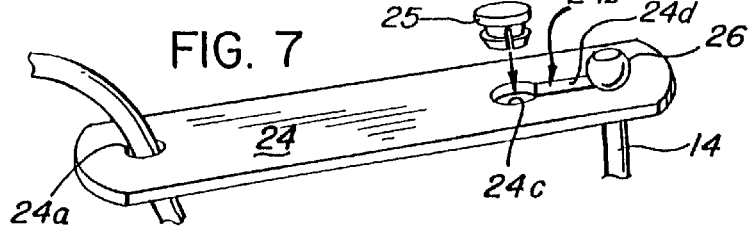
FIG. 7 is a perspective view of a tension bar.

The free end 14a of the upper guy line section 14 receives a flexible collar 22 such as a section of rubber tubing or garden hose which is adapted to extend around the trunk or limb of the tree to prevent the guy line from cutting or otherwise damaging the tree. See FIG. 1. The upper and lower guy line sections are preferably made of wire rope encased in plastic tubing. A flat elongated tension bar 24 removes slack and places the guy line in tension as a final step in the installation of the system. The tension bar is provided at one end with a hole 24a which has a diameter slightly larger than the diameter of the guy line to allow the bar 24 to slide along the line when the bar is positioned in a plane approximately perpendicular to the line and to bite into the line when positioned at a predetermined angle thereto, say 30% or more. The tension bar is provided at the other end with an old-fashioned key hole opening 24b having a circular (or enlarged) hole 24c through which a spherical (or enlarged) terminating bushing or ball 26 (swaged onto the end 14a of the line 14) freely passes. The key hole opening further includes an elongated slot 24d for accommodating the line 14, but not the bushing 26 as is best illustrated in FIG. 7. A plug 25 made of plastic or other semi-rigid material, is provided to be inserted into the round hole 24c to prevent the ball end 26 of the end of the upper line section 14 from accidentally exiting the keyhole.

Figure 6:
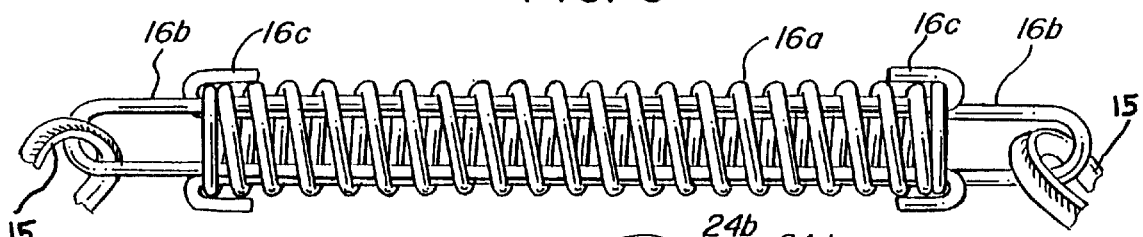
FIG. 6 is a side elevational view of one of the limited extension spring assemblies providing the shock absorbing action of the guy line.

The limited extension spring assembly 16 includes a compression spring portion 16a in the form of a conventional coiled compression spring and a pair of line extension limit U-shaped hooks 16b extending therethrough. The free ends 16c of the hooks are bent back over the respective ends of the compression spring portion as is best illustrated in FIG. 6.

The other ends 12b and 14b of the lower and upper guy line sections, respectfully, extend through the open ends of the hooks 16b and are clamped back onto the respective lines via crimping sleeves 28 and 30. Preferably, metal thimble eyes 15 are placed between the lines and the open ends of the hooks to prevent the hooks from abrading the lines.

Referring now particularly to FIGS. 3–5, the anchor 18 has a shaped generally in the form of an arrowhead with tapered body portion which is symmetrical about a longitudinal axis x-x. The body portion includes a central section 18b which tapers downwardly from a proximal, or back, end 18c to a pointed distal, or front, end 18d. A pair of opposed side sections 18e extend laterally outwardly from the central sections and taper inwardly from the central section to terminal free or side edges 18f. The side edges 18f also taper downwardly to the distal end 18d. The openings 18a are located in the side sections about midway between the proximal and distal ends. The side edges 18f taper downwardly, at an acute angle to the longitudinal axis, to the pointed distal end 18d. The proximal end 18c forms a flat shelf 18g lying in a plane perpendicular to the longitudinal axis and a tool engaging member 18h which projects upwardly from the shelf.

Referring now to FIGS. 10–13, another embodiment of an anchor for use in the present invention is generally in the shape of an arrowhead and composed of a forward section 32a, a rearward section 32b, and a tool engaging member 32c. The forward section is generally of the shape of a triangle and has a tip 32g and a base 32h that is symmetrical about a longitudinal axis. This forward section forms a barbed front portion of the anchor that facilitates penetration into the ground and further resists any rearward force against the anchor.

The rearward section is composed of a centrally disposed elongated body member 32e which tapers inwardly from a top portion 32m to the bottom 32n with an indentation about one-third of the distance from the top to the bottom as shown. A pair of opposed side sections 32j extend laterally outward from the central body member 32e and tapers inwardly to terminal or free edges. The free edges also extend downwardly to the front 32i as shown. The base 32h of the forward section extends laterally i.e. perpendicular to the longitudinal axis, beyond each side of the base 32h front section as is best illustrated in FIGS. 11 an 12. The side sections define two openings 32d in approximately lateral alignment with the indentation.

The guy line is threaded through the openings and lays within the indentation to secure the line to the anchor. Projecting from the centrally disposed elongated body member 32e are a pair of sides 32j that taper outwardly from the front 32i to the back 32f and defining a leading edge 32k. The face of the back 321 of the rearward section is flat to resist any rearward force applied to the anchor once the anchor is in the ground.

The generally cylindrical tool engaging member 18h, with vertically extending ribs 18i, is adapted to slidably receive one end of a tool having a cylindrical opening therein, such as a short length of standard ½" or ¾" pipe. As is illustrated in FIG. 8, a section of pipe 34 forms a convenient tool to insert the anchor a suitable distance below the surface of the ground to withstand the anticipated forces on the guy line, say 18" to 24" or more. The anchors are preferably molded of a suitable plastic material such as nylon; polypropylene, etc. I have found that an anchor having (1) a length of about 3½" from the pointed distal end to the proximal shelf portion, (2) a width of about 3" at the proximal shelf portion and (3) a cylindrical tool engaging member which is about 1" in length and ½" in diameter provides a satisfactory anchor for small trees. Such dimensions should be increased for larger trees or other objects requiring more support.

To stabilize a newly planted tree, or other object such as a vertically extending pole used for example as a scaffolding component, a plurality (preferably 3) of the anchors 18 (with the lines attached thereto and extending from the top thereof) are driven into the ground at spaced points, i.e., at 120 intervals, around the base of the tree (or pole) via a length of pipe 26 and a hammer 30 as is illustrated in FIG. 8. Each lower guy line section is then pulled upwardly to cause the distal end of the anchor to rotate so that the plane of the anchor assumes a more perpendicular attitude to a line extending from the anchor to the tree. The free end of the upper section of guy line with a collar inserted thereover is then looped around the desired portion of the tree, e.g., trunk or limbs.

The ball 26 at the free end of the upper section of each line is then inserted in to the key hole of a respective tension bar followed by the insertion of the plug 25 into the hole 24c. The tension bars are then positioned to provide the desired tension in each line. To lengthen (or shorten) the lines to accommodate tree growth etc., it is only necessary to reposition the tension bars.

There has thus been described a novel tree guy line system and staking anchor which may be quickly installed and can accommodate large forces such as those associated with wind gusts without exceeding the elastic limit of the shock absorbers. Various modifications and improvements to the system will occur to those skilled in the art without involving a departure from the spirit and scope of the invention as defined in the appended claims.

What is claimed is:

1. A method for stabilizing trees comprising the steps of:
   providing a plurality of guy lines having a first and second ends, each guy line including a limited extension spring assembly disposed between the ends thereof, the first end of each guy line terminating in an enlarged end;
   providing a tension bar for each guy line, each tension bar having a tension adjustment opening at one end through which a respective guy line passes, the tension adjustment opening having a diameter slightly greater than the diameter of the line, the other end of the tension bar defining a key hole opening with a distal opening through which the enlarged end freely passes and a substantially rectangular opening for accommodating the line, but not the enlarged end;
   providing an anchor for each guy line, each anchor having a longitudinal axis and a shape generally in the form of an arrowhead having a barbed front portion and lying in plane with a pair of side edges extending downwardly from a back to a front end at an acute angle to the longitudinal axis, each anchor further defining a pair of openings disposed on opposite sides of the longitudinal axis and approximately midway between the front and back, the second end of a respective guy line being looped through the opening therein and secured back to the guy line;
   selecting a plurality of locations around the tree for receiving the anchors;
   driving an anchor into the ground at each selected location so that the anchor is disposed below ground level with the plane of the anchor being generally parallel to or intersecting an axis extending vertically from the tree above the ground level;
   applying a force to the line secured to each anchor to rotate the anchor within the ground so that the plane of the anchor assumes a more perpendicular position to a line drawn between the anchor and the tree;
   extending the first end of each guy line around the trunk or limb of a tree;
   passing the enlarged end of the guy line through the distal opening, sliding the guy line within the substantially rectangular opening;
   sliding the end of each tension bar, bearing the tension adjustment opening along the respective line to place the respective spring in limited extension spring assembly in compression; and
   releasing the tension bar.

2. The method of claim 1 wherein the driving step includes disposing each anchor a sufficient distance below the ground to withstand the anticipated forces on the guy line.

3. The method of claim 2 wherein the anchors are disposed below the ground approximately 18 inches or more.

4. The method of claim 3 wherein the back of the anchor includes a tool receiving member being of the generally cylindrical in form and projecting upwardly wherein an elongated tool with a cylindrical stub is utilized to place each anchor into the ground.

5. A method for stabilizing trees comprising the steps of:

providing a plurality of guy lines having a first and second ends, each guy line including a limited extension spring assembly disposed between the ends thereof, the limited extension spring assembly comprising a compression coil spring with a pair of U-shaped hooks extending therethrough with free ends of the hooks bent back over the respective ends of the spring;

providing an anchor for each guy line, each anchor having a longitudinal axis and a shape generally in the form of an arrowhead lying in plane with a pair of side edges extending downwardly from a back to a front end at an acute angle to the longitudinal axis, each anchor further defining a pair of openings disposed on opposite sides of the longitudinal axis and approximately midway between the front and back, the second end of a respective anchor being looped through the opening therein and secured back to the guy line;

selecting a plurality of locations around the tree for receiving the anchors;

driving an anchor into the ground at each selected location so that the anchor is disposed below ground level with the plane of the anchor being generally parallel to or intersecting an axis extending vertically from the tree above the ground level;

applying a force to the line secured to each anchor to rotate the anchor within the ground so that the plane of the anchor assumes a more perpendicular position to a line drawn between the anchor and the tree; and looping the first end of each guy line around the trunk or limb of a tree and securing said first end back to its associated guy line.

\* \* \* \* \*